United States Patent [19]

Sugiyama

[11] Patent Number: 5,808,667
[45] Date of Patent: Sep. 15, 1998

[54] METHOD OF AUTOMATICALLY REGENERATING AND PRINTING FILM IMAGE

[75] Inventor: Naoshi Sugiyama, Asaka, Japan

[73] Assignee: Fuji Photo Film Co., Ltd., Kanagawa, Japan

[21] Appl. No.: 454,820

[22] Filed: May 31, 1995

[30] Foreign Application Priority Data

Jul. 14, 1994 [JP] Japan .................................... 6-162192
Jul. 14, 1994 [JP] Japan .................................... 6-162193

[51] Int. Cl.⁶ ...................................................... H04N 7/18
[52] U.S. Cl. ................................ 348/96; 348/97; 348/110; 348/112; 348/111
[58] Field of Search ................................ 348/96, 97, 110, 348/111, 112

[56] References Cited

U.S. PATENT DOCUMENTS

| | | | |
|---|---|---|---|
| 4,763,186 | 8/1988 | Belmares-Sarabia et al. | 358/22 |
| 4,862,200 | 8/1989 | Hicks | 354/266 |
| 5,032,855 | 7/1991 | Taniguchi et al. | |
| 5,142,310 | 8/1992 | Taniguchi et al. | |
| 5,179,409 | 1/1993 | Kazami et al. | |
| 5,206,929 | 4/1993 | Langford et al. | 395/159 |
| 5,309,242 | 5/1994 | Asami et al. | |
| 5,389,966 | 2/1995 | Ikari et al. | |
| 5,412,773 | 5/1995 | Carlucci et al. | 395/156 |
| 5,457,491 | 10/1995 | Mowry | 348/96 |
| 5,541,644 | 7/1996 | Nanba | 348/96 |
| 5,546,122 | 8/1996 | Asami et al. | 348/96 |
| 5,623,303 | 4/1997 | Inoue et al. | 348/96 |

FOREIGN PATENT DOCUMENTS

| | | |
|---|---|---|
| 1-279250 | 11/1989 | Japan . |
| 1-289948 | 11/1989 | Japan . |
| 5-75922 | 3/1993 | Japan . |
| 9004301 | 4/1990 | WIPO . |

Primary Examiner—Tommy P. Chin
Assistant Examiner—Anand S. Rao

[57] ABSTRACT

An index image which shows plural frames on a film strip within a film cartridge and/or a film image in one frame are displayed on a display. Information relating to automatic regeneration or automatic printing for regenerating plural film images on the film sequentially and automatically is entered by an user who is looking at the display. The entered automatic regeneration information or automatic printing information are recorded in a record medium which corresponds to the film cartridge. When the automatic regeneration or automatic printing is performed, the film player reads out the automatic regeneration information or the automatic printing information from the record medium, and automatically regenerates or prints the plural film images on the film strip in accordance with the readout automatic regeneration information or automatic printing information. As a result, once the automatic regeneration information or the automatic printing information is recorded in the record medium, the automatic regeneration or printing can be carried out repeatedly and anytime.

7 Claims, 13 Drawing Sheets

METHOD OF AUTOMATICALLY REGENERATING AND PRINTING FILM IMAGE

BACKGROUND OF THE INVENTION

1. Field of the Invention

The present invention relates to a method of automatically regenerating and printing a film image, and more particularly to a method of automatically regenerating and printing a film image, wherein plural film images on a film strip are sequentially and automatically regenerated on a monitor TV or printed sequentially and automatically.

2. Description of the Related Art

Conventionally, a film cartridge houses a developed film and is provided with a region in which information can be recorded (Japan Patent Application Laid-open No. 1-279250). A method of recording information which does not concern a film image in a film cartridge and the like which have a non-volatile semiconductor memory and a circuit for reading and writing in the memory.

Information relating to printing is recorded in a record medium which in a film cartridge disclosed in the Japan Patent Application Laid-open No. 1-279250. In a record medium in a film cartridge disclosed in Japan Patent Application Laid-open No. 1-289948, information delivered from a film to a camera, information delivered from a camera to a laboratory, information which is delivered from a photographer and a development agency to a laboratory, and information delivered from a laboratory and a development agency to a photographer are all recorded. In the record medium provided in the conventional film cartridge, information relating to automatic regeneration for regenerating plural film images on a film strip sequentially and automatically on the monitor TV is not recorded. Therefore, the above-referenced applications fail to disclose a film image regeneration apparatus which reads out information relating to automatic regeneration from the record medium and regenerates plural film images sequentially and automatically from the readout information.

Moreover, W090/04301, Japan Patent Application Laid-open NO. 5-759222 and others disclose a film player which picks up a developed still photographic film by an image sensor such as a CCD and the like, converts an image on the photographic film into image signals, and transmits the signals to a monitor TV so as to display a film image. A printer which prints an image according to video signals is also well known.

Accordingly, when video signals are transmitted from a film player to a printer, a film image can be printed.

However, when a film image is printed by the printer, a film player has to regenerate each film image which is to be printed one by one, and instructs the number of prints and the like. Therefore, there is a disadvantage in that it requires a lot of time and effort to print film images on a film strip. Likewise, it requires a lot of effort to make additional copies of a print, and it is difficult to get the film which has the same quality as when printed at first.

SUMMARY OF THE INVENTION

It is an object of the present invention to provide a method of automatically regenerating a film image, wherein plural film images on a film strip are sequentially and automatically displayed on a monitor TV.

It is another object of the present invention to provide a method of automatically printing a film image, wherein plural film images are printed full-automatically and sequentially, and wherein additional copies can be easily made.

To achieve the above-mentioned objects, a method of automatically regenerating a film image in which a film cartridge which houses a developed photographic film is used, the film is fed from the film cartridge to an image reading part so that the film image is read, and the film image is displayed on a monitor TV, comprises the steps of displaying an index image which shows plural frames on the film strip within the film cartridge and/or the film image in one frame on a monitor TV, entering automatic regeneration information which relates to regenerating plural film images on the film strip within the film cartridge sequentially and automatically while watching a screen of the monitor TV, recording the automatic regeneration information in a record medium corresponding to a film cartridge, reading out the automatic regeneration information from the record medium at the time of automatic regeneration, and regenerating the plural film images sequentially and automatically in accordance with the readout information concerning automatic regeneration.

And, according to the present invention, a method of automatically printing a film image which uses a film cartridge housing a developed still photographic film, a player which feeds the film from the film cartridge to an image reading part, picks up a film image and displays the film image on a monitor TV, and a printer which prints the film image in accordance with an image signal which is entered comprises the steps of displaying an index image which shows plural frames on the film strip within said film cartridge and/or a film image in one frame on said monitor TV via said film player, entering automatic printing information relating to printing plural film images within said film sequentially and automatically while looking at the screen of said monitor TV, recording said automatic printing information in a record medium corresponding to the film cartridge, reading out said automatic printing information from said record medium, picking up the film image which is instructed to be printed in accordance with the automatic printing information via said film player, and transmitting a video signal and a control signal which controls the printer from said film player to said printer.

According to the present invention, an index image which shows plural frames on the film strip within the film cartridge and/or the film image in one frame is displayed on the monitor TV, and automatic regeneration information which relates to regenerating plural film images on the film strip sequentially and automatically by an user who is looking at the display screen, and the automatic regeneration information is recorded in the record medium corresponding to the film cartridge. Then, the automatic regeneration information is read out from the record medium, and plural film images on one film strip are sequentially and automatically regenerated in accordance with the readout information concerning automatic regeneration at the time of automatic regeneration. Accordingly, once the automatic regeneration information is recorded in the record medium, the automatic regeneration can be carried out repeatedly and anytime. The storage of the automatic regeneration information and the automatic regenerating can be respectively performed in different machines.

According to the other mode of the present invention, the film player displays on a monitor TV the index image, which shows plural frames on a film strip within a film cartridge, and/or the film image in one frame, and receives automatic printing information which relates to printing plural film images on a film strip by looking at a display screen, and records the received information concerning automatic printing in a record medium corresponding to the film cartridge. Then, the film player reads out the automatic printing information from the record medium at the time of automatic printing, and picks up the film image, which is instructed to be printed, in accordance with the automatic printing information, and transmits a video signal, which shows the film image, and a control signal, which controls the printer, to the printer. Therefore, once the information concerning automatic printing is recorded in the record medium, the film image on a film strip can be printed full-automatically, and additional copies having same quality as an original print can be obtained. A film player which records the automatic printing information and a film player which regenerates the film image in accordance with the automatic printing information and produces a signal for controlling the printer can be separately employed.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of a method of automatically regenerating and recording a film image according to the present invention with reference to the accompanying drawings.

Figure 1:
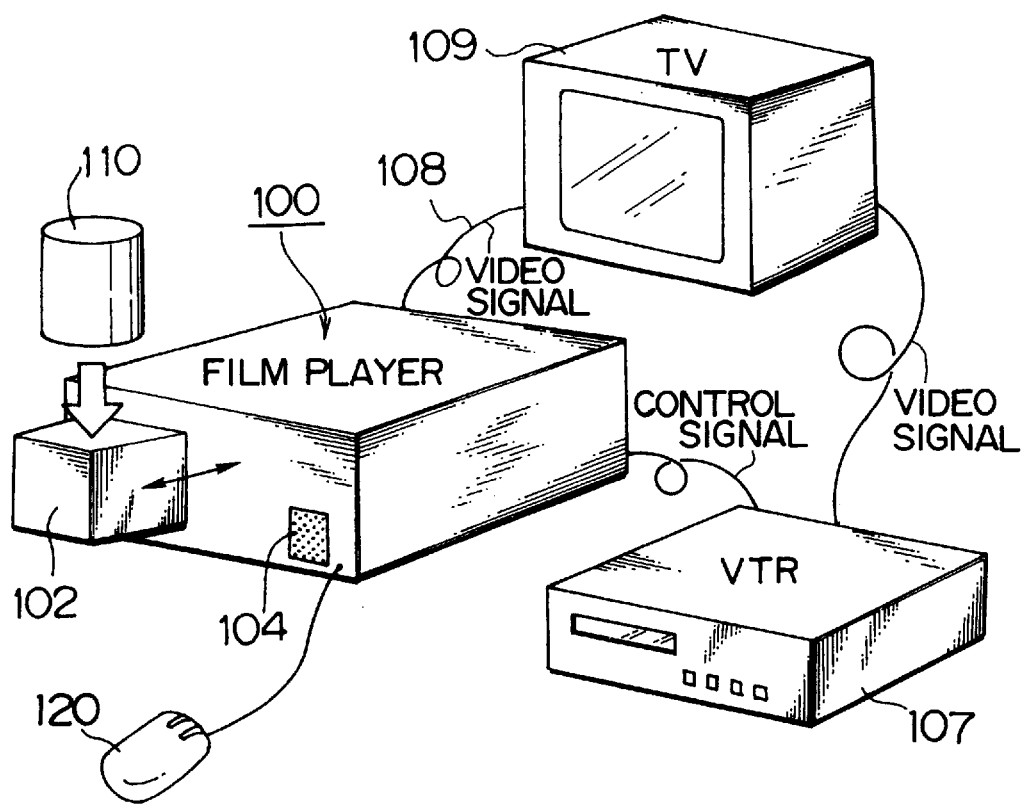
FIG. 1 is an outer view illustrating a film player wherein a method of automatically regenerating a film image according to the present invention is applied.

FIG. 1 is an outer view of the film player wherein the method of automatically regenerating the film image according to the present invention is applied. As shown in FIG. 1, the film player 100 has a rectangular-parallelepiped shape, and a film cartridge 102 and a power source switch 104 are provided on the front surface of the film player 100. When the film cartridge 110 is loaded and unloaded, the film cartridge 102 moves forward and backward, so that the film cartridge 110 can be housed and taken out.

A mouse 120, a monitor TV 109 and a video tape recorder (VTR) 107 are connected to the film player 110. Various kinds of operation signals are sent from the mouse 120 to the film player 100 so as to control the film player 100. From the film player 100, video signals are transmitted to the monitor TV 106, and a control signal is transmitted to the VTR 107. A video signal is transmitted from the monitor TV 109 to the VTR 108. Detail description will be given of the control of the film player 100 with the mouse 120.

Figure 2:
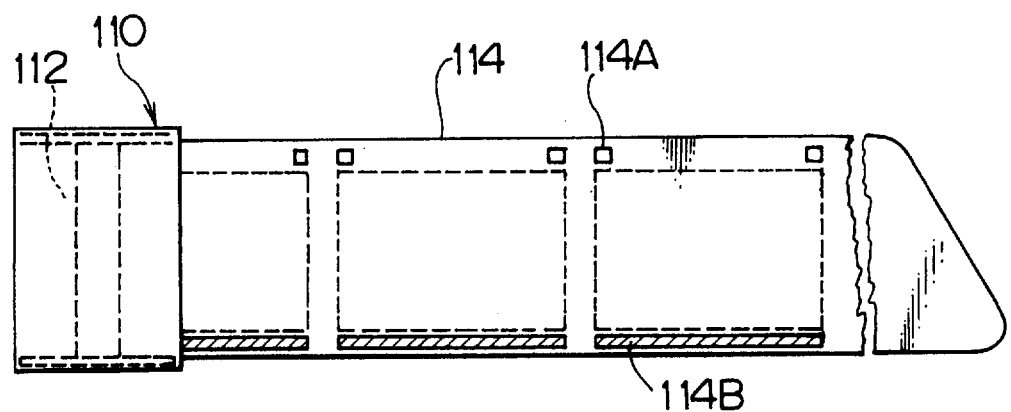
FIG. 2 is a view illustrating one example of a film cartridge which is used in the film player of FIG. 1.

The film cartridge 110 has a single spool 112 as shown in FIG. 2, and a photographic film 114 is wound around the spool 112. On the photographic film 114, a perforation 114A is provided which indicates a position of each frame, and a magnetic record layer 114B is also formed on the entire surface or the edge of the film. Magnetic data, which indicates the data relating to photographing for each frame, can be recorded in the magnetic record layer 114B by a camera which has a magnetic head. The developed photographic film 114 is wound around the film cartridge 110 to be recorded.

A camera which employs the film cartridge 110 records various kinds of magnetic data for each frame in the magnetic record layer 114B on the film 114 by means of the magnetic head which is provided in the camera. The magnetic data to be recorded are, for example, a frame number, a print format which indicates one of hi-vision, panoramic and normal, the date/time of photographing and the like. In addition, the camera records many other kinds of data. Furthermore, the data relating to a type of film, a bar code indicating frame numbers and a frame format which is made by the light source provided in the camera, etc. can be optically recorded on the photographic film 114, except for the frame area which is exposed by the light of the subject.

Figure 3:
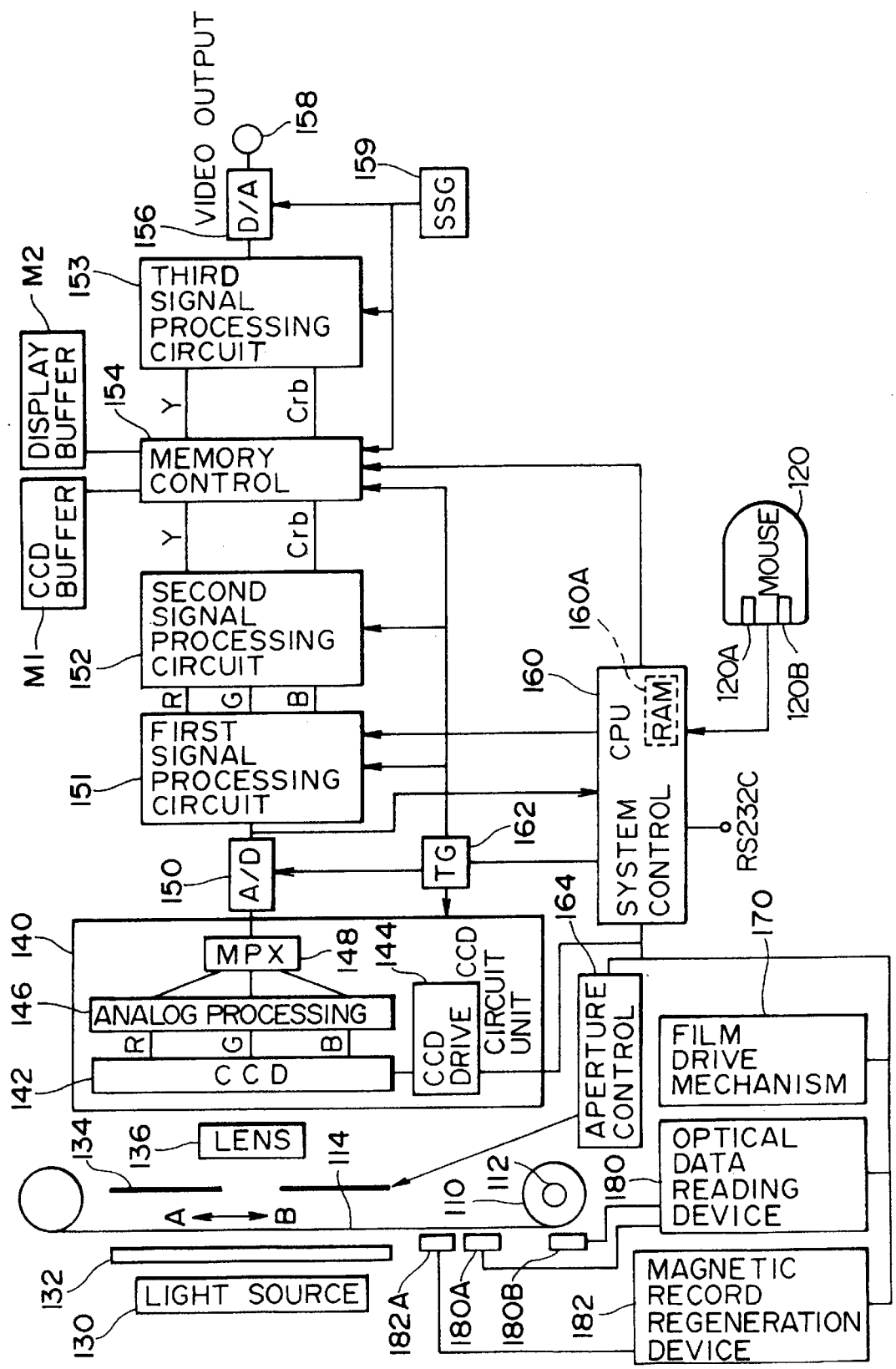
FIG. 3 is a block diagram illustrating one embodiment of the inner structure of the film player of FIG. 1.

FIG. 3 is a block diagram illustrating one embodiment of the inner structure of the film player 100. The film player 100 mainly comprises a light source 130, a taking lens 136, a CCD circuit unit 140 which includes a CCD line sensor 142, a first signal processing circuit 151, a second signal processing circuit 152, a third signal processing circuit 153, a memory control circuit 154, a CCD buffer M1, a display buffer M2, a central processing unit (CPU) 160, a film drive mechanism 170, an optical data reading unit 180, a magnetic record regenerating unit 182, and so forth.

The light source 130 is a long fluorescent light which is provided in the direction perpendicular to the feed direction of the film 114, and illuminates the film 114 through an infrared cutting filter 132. The light, which has been transmitted through the film 114, is formed on the light-accepting surface of the CCD line sensor 142 through the taking lens 136 which is a fixed-focus type. While the CCD line sensor 142 is picking up the film image, the film 114 is moved in the direction of an arrow A (hereinafter referred as a forward direction) or in the direction of an arrow B (hereinafter referred as a backward direction) at a fixed speed by the film drive mechanism 170. Detailed explanation will be given of the film drive later.

The CCD line sensor 142 is provided in the direction perpendicular to the film feed direction. The image light formed on the light-accepting surface of the CCD line sensor 142 is charged for a predetermined period of time in each sensor, which has R, G and B filters, and is converted into R, G and B signal charge which corresponds to the light strength. The signal charge is sent to a shift register by a lead gate pulse of a predetermined cycle, which is added by the CCD drive circuit 144, and sequentially read out from the CCD line sensor 142 by a register transfer pulse.

The CCD line sensor 142 has, for example, a sensor of 1024 picture elements in the direction perpendicular to the film feed direction. The number of picture elements in the same direction as the film feed direction of one frame changes according to the film feed speeds when a cycle of the lead gate pulse, etc. of the CCD drive circuit 144 does not change. For example, when the film feed speed is ½, 1, 8, 16 times as fast as that in the case when the standard film image is picked up, the number of picture elements is 1792, 896, 112, and 56 respectively.

The signal charge, which has been read out from the CCD line sensor 142 in the above-mentioned way, is clamped by a CDS clamp and sent to an analog processing circuit 146 as R, G and B signals, and a gain, etc. of the R, G and B signals are controlled in the analog processing circuit 146. The multiplexer 148 dot-sequentially transmits R, G and B signals which are sent from the analog processing circuit 146, and the R, G and B signals are converted into digital signals by the A/D converter 150, and then added to the first signal processing circuit 151 and the CPU 160.

The first signal processing circuit 151 includes a white-balance adjustment circuit, a negative-positive inversion circuit, a γ-correction circuit, a RGB circuit which transmits R, G and B signals simultaneously, and so forth, and sends R, G and B signals to the second signal processing circuit 152 after signal-processing the dot-sequential R, G and B signals, which are sequentially added, in each circuit. The white-balance adjustment circuit in the first signal processing circuit 151 carries out the white-balance in accordance with control signal which is transmitted from the CPU 160, and a detailed explanation on it will be given later.

The second signal processing circuit 152 includes a matrix circuit, produces a luminance signal Y and a chrome signal $C_{r/b}$ from the entered R, G and B signals, and sends them to the memory control circuit 154.

The memory control circuit 154 controls the transmission of the luminance signal Y and the chroma signal $C_{r/b}$ from the memory control circuit to the CCD buffer M1, and also controls the transmission of the luminance signal Y and the chrome signal $C_{r/b}$ from the CCD buffer M1 to the display buffer M2. Incidentally, the detailed explanation will be given later of the CCD buffer M1 and the control of the writing/reading in the display buffer M2.

The luminance signal Y and the chroma signal $C_{r/b}$ which are read out from the display buffer M2 by the memory control circuit 154 are sent to the third signal processing circuit 153. The third signal processing circuit produces a color composite video signal of NTSC system, for example, and transmits it to a video output terminal 158 via the D/A convertor. Incidentally, the synchronizing signal which has a predetermined cycle are transmitted to the memory control circuit 154, the third signal processing circuit 156 and the D/A converter 153 by a sync-generator 159. As a result, a timing signal which is controlled by the CPU 160 is added to the CCD circuit unit 140, the A/D converter, the first signal processing circuit 151, the second signal processing circuit 152 and the memory control circuit 154 by a timing signal generator 162 which is controlled by the CPU 160, so that each circuit can be synchronized.

The film drive mechanism 170 is connected to the spool 112 of the film cartridge 110, and comprises a film supplying part which rotates the spool 112 forward/backward, a film winding part which winds the film 114 sent from the film supplying part, a mechanism which is provided in a film conveying path and which feeds the film 114 through and between a capstan and a pinch roller at a fixed speed. Incidentally, the film supplying part drives the spool 112 of the film cartridge 110 clockwise in FIG. 3, and feeds the film 114 from the film cartridge 110 until the forward end of the film is wound by the film winding part.

An optical data reading device 180 includes a first optical sensor 180A, which optically detects a perforation 114A of the film 114, and a second optical sensor 180B, which optically detects the optical data such as a bar code, etc. written in the edge of the film, and processes the optical data which is detected by these optical sensors 180A and 180B and transmits them to the CPU 160.

The magnetic data regenerating device 182 has a magnetic head 182A, reads out magnetic data, which are recorded in the magnetic record layer 114B of the film 114, with the magnetic head 182A. And, the device 182 processes the magnetic data to send them to the CPU 160 and stores them in a RAM 160A. Then, it reads out the data stored in the RAM 160A of the CPU 160, converts them into appropriate signals for a magnetic recording to transmit them to the magnetic head 182A so as to record them in the magnetic record layer 114B of the film 114.

Figure 4:
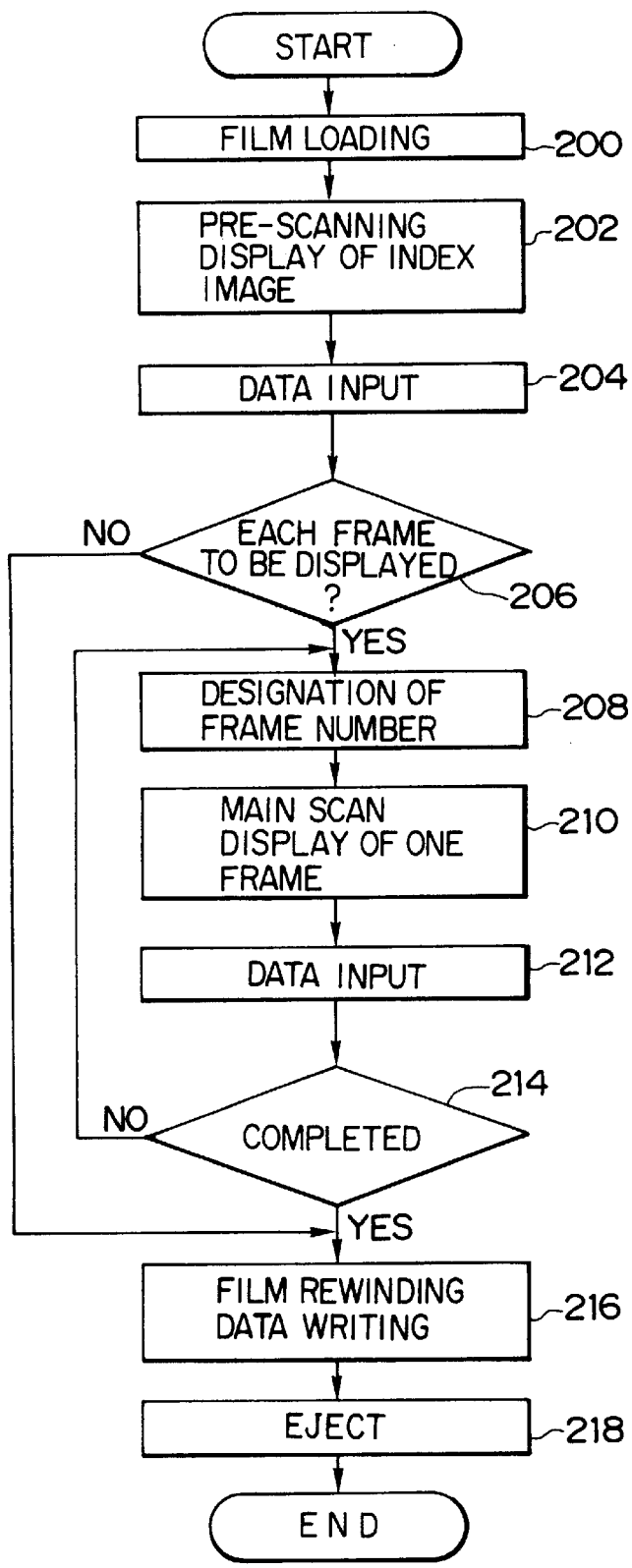
FIG. 4 is a flow chart explaining the operation of the film player of FIG. 1.

Next, an explanation will be given of the operation of the film player 100, which has the above-described structure with reference to a flow chart of FIG. 4.

First, when the film cartridge 110 is set in a film cartridge tray 102, the CPU 160 carries out the film-loading by controlling the film drive mechanism 170 (Step 200). That is, the film 114 is sent out from the film cartridge 110, and a forward end of the film is wound around the winding axis of the film winding part.

After the film-loading is completed, the first pre-scanning of the film 114 is carried out. That is, the film 114 is fed in the forward direction at a high speed of 148.0 mm/s, and then rewound in the backward direction at a high speed of 148.0 mm/s. When the first pre-scanning in the forward direction is carried out, the image data is picked up by the CCD line sensor 142, and optical data and magnetic data are read by the optical data reading unit 180 and the magnetic record regenerating unit 182.

Next, an explanation will be given of the processing according to the image data which is picked up when the first pre-scanning is performed.

Figure 5:
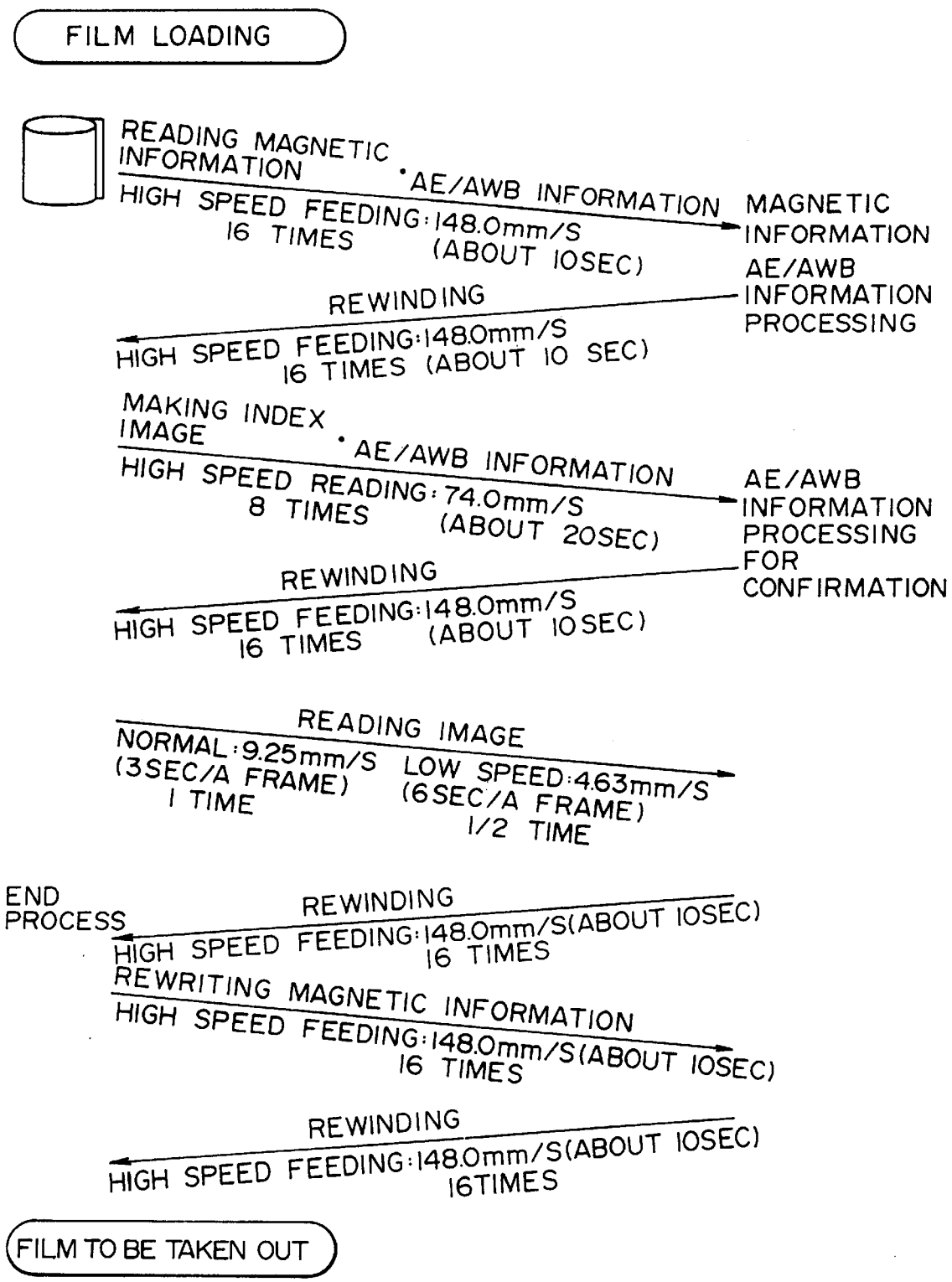
FIG. 5 is a view illustrating one example of a conveying sequence of a film in the film player of FIG. 1.
Figure 6A:
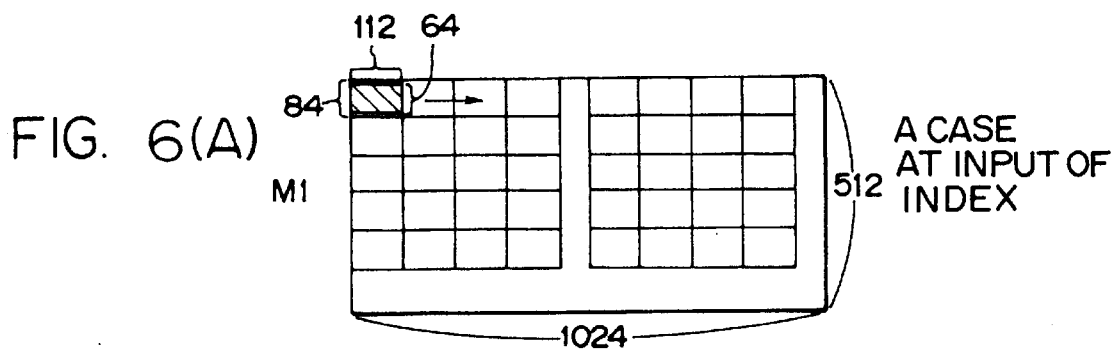
FIGS. 6(A), 6 (B), 6(C), and 6(D) are views illustrating the storage region of the CCD buffer and that of the display buffer in the film player of FIG. 1 and a display screen in a monitor TV.
Figure 6B:
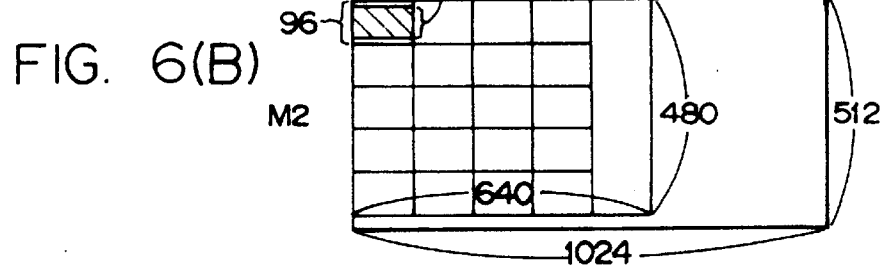
Figure 6C:
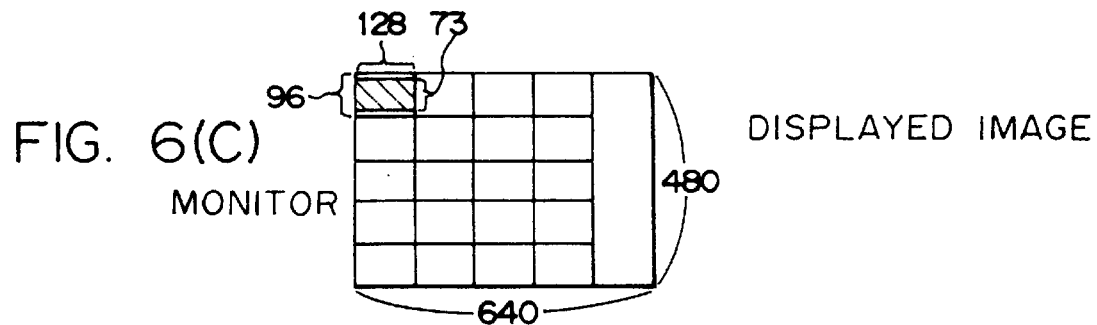
Figure 6D:
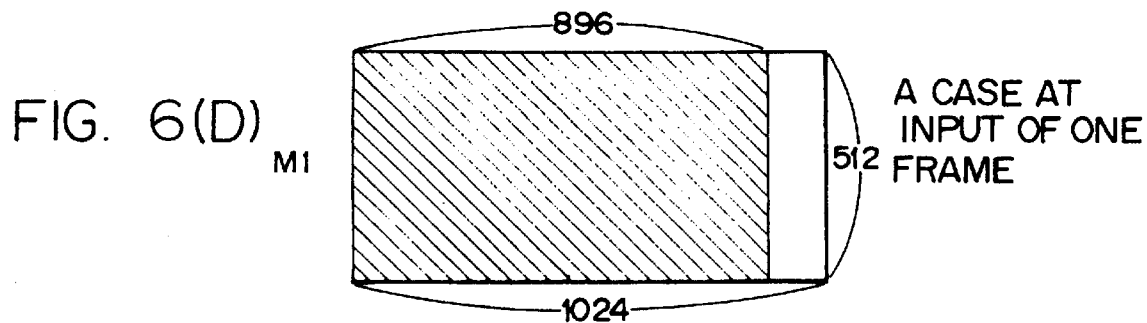

The dot-sequential R, G and B signals are sent from the A/D converter 150 which is shown in FIG. 3 to the CPU 160. The CPU 160 receives R, G and B signals of all frames respectively, and calculates offset quantity and gain adjustment quantity to adjust the white-balance for respective R, G and B signals. Then, it stores offset data which indicates the offset quantity and the AWB data which indicates the gain adjustment quantity for each frame in a random access memory (RAM) 160A provided in the CPU 160. The CPU 169 stores AE data indicating the brightness of each frame, which R, G and B signals have in the RAM 160A. The CPU 160 detects each frame on the film 114 in accordance with the optical data and/or the magnetic data which is added by the optical data reading device 180 and the magnetic record regenerating device 182, and it also detects a frame number by counting each frame. Next, the second pre-scanning of the film 114 is carried out. As shown in FIG. 5, the film 114 is fed again in the forward direction at a high speed of 74.0 mm/s, and then rewound in the backward direction at a high speed 148.0 mm/s. When the second pre-scanning in the forward direction is performed, the image data is picked up by the CCD line sensor 142. When the image data is picked up, the CPU 160 controls an aperture 134 for each frame with a control unit 164 in accordance with AE data which is stored in RAM 160A. When the CCD line sensor 142 has an electric shutter mechanism, the CCD drive circuit 144 adjusts the exposure quantity by controlling time for charging in the CCD line sensor 142. In this case, the aperture 134 and an aperture control unit 164 are not required.

The CPU 160 makes the first signal processing circuit 151 adjust the offset quantity and the white balance of R, G and B signal for each frame. That is, the CPU 160 sends the offset data of the respective R, G and B signals in each frame to the circuit 151, which adjusts the offset quantity of dot-sequential R, G and B signals according to the offset data. Similarly, the CPU 160 sends the AWB data of respective R, G and B signals in each frame which is stored in the RAM 160A to the circuit 151 adjusts the gain of dot-sequential R, G and B signals according to the AWB data.

The image data in each frame is adjusted according to the AE data, the AWB data, etc., so that the high-quality image data can be picked up regardless of photographing conditions in each frame.

The image data in each frame, which is adjusted in the above-mentioned way, that is, the luminance signal Y and the chroma signal $C_{r/b}$ from the second signal processing circuit 152 are sequentially stored in the CCD buffer M1 by the memory control circuit 154. As described above, the film 114 is fed at the speed which is eight times as fast as the feed speed in the case when the normal film image is picked up, so the number of picture elements in the same direction as the film feed direction of one frame is 112 as shown in FIG. 6 (A). The CCD line sensor 142 has a sensor of 1024 picture elements in the direction perpendicular to the film feed direction as mentioned previously. In this case, the picture elements are thinned out to be 1/16 of 1024 picture elements, therefore, the number of picture elements in the direction perpendicular to the film feed direction of one frame is 64. The CCD buffer M1 has a storage capacity for storing the data of 512×1024 picture elements as shown in FIG. 6 (A), so it can store the image data of 5×4×2 (=40) frames. That is, the image data (hereinafter referred as the index image data) which shows the index image of 40 frames is stored in the CCD buffer M1.

The display buffer M2 has a storage capacity for storing the data of 512×1024 picture elements as shown in FIG. 6 (B). In the case of storing the above-mentioned index image data, the number of picture elements in one frame is made to be 73×128 picture elements and the display buffer M2 stores the image data of 4×5 (=20) frames. Then, in the case of displaying the index image on the monitor TV 106, the region of 480×640 picture elements, which is located at the upper left of the display buffer M2 is read out (refer to FIG. 6 (B) and FIG. 6 (C)).

The display buffer M2 stores the image data of only 20 frames at one time, so the index image of 40 frames is displayed by scrolling the index image or switching screens. Incidentally, the CPU 160 provides a frame number (1, 2 . . .) with each frame in accordance with the pick-up order of the image data in each frame at the time of the above-mentioned scanning, and generates a character signal indicating the frame number of each frame to display the index image in which the frame number is superimposed (Step 202).

When the index image is made as mentioned above and the index image is displayed on the monitor TV 106, various types of information (hereafter referred as automatic regeneration information), which are necessary for regenerating a desired film image on the monitor TV, are entered by using the mouse 120 while looking at the index image (Step 204).

Examples of the information for automatic regeneration are given below:

<Automatic regeneration information: Information which relates to automatic regeneration>

Information relating to the length and breadth of a frame: information relating to having a regenerated screen correctly positioned on a monitor and information relating to instructing the up-down and right-left.

Automatic zooming information: information which relates to information concerning a magnification at the start of zooming, a magnification at the end of zooming and a zooming time.

Screen switch information: Information which instructs the method of switching screens among frames, and which indicates immediate switching, scroll in/out, fade in/out, overlap, and wipe in/out, and information concerning the switching time for the above mentioned operation (with a second a unit).

Screen movement information: information concerning the scanning within a screen of a frame (information relating pan and tilt) and information relating to time for above-mentioned movement.

Display time information: Information relating to the displaying time of each frame (with a second a unit).

Sound information at the time of regeneration: instruction as to what kind of music is played at the time of automatic regeneration (instruction for each frame or a whole film strip).

Start frame information: information concerning start frame number at the time of automatic display.

End frame information relating to a frame number wherein regeneration ends: information concerning an end frame number at the time of automatic display.

Next frame information: information relating to the frame number of a frame which is processed after the displayed frame.

Non-regenerated frame information: information relating to instructing a frame number which is not regenerated at the time of automatic display, or information which is provided for each frame, relating to whether a frame is regenerated or not.

Dubbing information: information concerning dubbing instruction for a VTR.

<Information relating to automatic printing/automatic regenerating>

Letter information: information concerning letters in each frame, and letters in a whole film strip.

Photographing date/time information: information concerning the date and time of photographing for each frame.

Trimming information: information relating to instructing the range, which is regenerated on a monitor, from a frame as a whole, and kinds and positions of trimming.

Color correction information: information which is set manually, relating to luminance, color, color density, contrast, and sharpness.

Automatic color correction information: information which is automatically set at the time of pre-scanning, relating to the previously-mentioned AE and ALB data.

Special monitor effect information: information concerning automatic color correction for the contents of each frame screen (a sunset effect, a night view effect and the like).

Close-up information: information relating to magnification and a central position of magnification.

Letter display information: information relating to display/non-display of a title, the date and time and the like, and a display color and a display position.

<Automatic printing information: Information relating to automatic printing>

Print number information: Information relating to the number of prints made for each film screen.

Each piece of the above-described information is entered by a [EXECUTE] key 120A and a [CANCEL] key 120B (refer to FIG. 3) of a mouse 120, and by instructing a position of an arrow with a roll.

Figure 7:
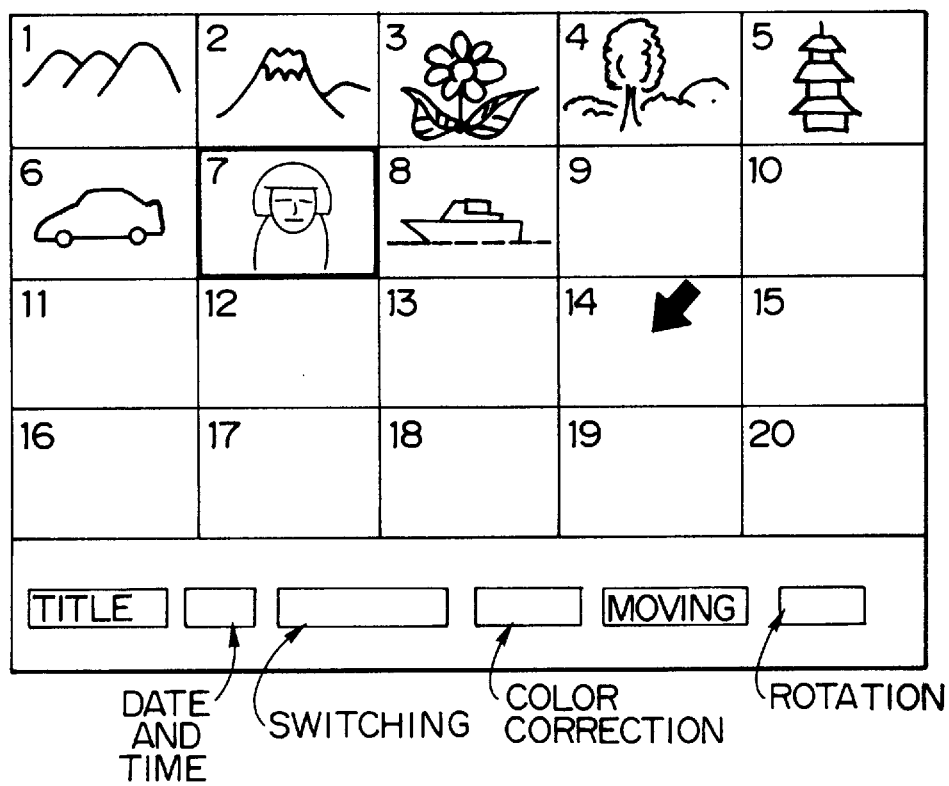
FIG. 7 is a view illustrating one example of a monitor screen in the case when automatic regeneration information and automatic printing information are input by means of an index image.

That is, as shown in FIG. 7, the CPU 160 displays the index image showing 20 frames, a letter which indicates various types of setting menu or an icon at the lower side on a monitor screen. A frame to be edited on the index screen is selected by moving the arrow to the frame to be edited with the mouse 120 and then clicking the [EXECUTE] key 120A. On the selected frame, a black frame which is darker than other frames is displayed as shown in the seventh frame in FIG. 7.

Then, the arrow is move d to a position of the letter or the icon which indicates the optional setting menu and the [EXECUTE] key 120A is clicked, so that the setting menu is selected. Normally, one of the frames is selected, but when information which is unrelated to each frame or information which is common to each frame (automatic regeneration start frame, frame title and others) is set, the frame which is selected at that time is ignored.

For example, when the information relating to the number of prints in each frame is entered, the menu to set the number of prints is selected by the mouse 120. A number, which indicates the number of prints, is displayed in, for example, the lower column on the monitor screen of the menu to set the number of prints. In this case, when the number of prints for each frame is set, the arrow is moved to a frame to be printed with the mouse 120 and the [EXECUTE] key 120A is clicked, and the arrow is moved to the number, which indicates the requested number of prints, and the [EXECUTE] key 120A is clicked. As a result, the frame to be printed is selected, and the number of prints for the selected frame is determined. By repeating this operation, the information relating to the number of prints for a plurality of frames can be entered. If a number, which indicates the number of prints, is displayed in each frame of the index image for each time the number of prints is set, overlap setting can be prevented. When the setting is cancelled, the [CANCEL] key 120B is clicked. In this case, each set-up value is kept as an initial value or a previous parameter, and the setting screen disappears.

When information concerning the regeneration order of each frame is entered, the menu to set the regeneration order is selected with the mouse 120. Then, the arrow is moved to a frame corresponding to the regeneration order with the mouse 120, and the [EXECUTE] key 120A is clicked. By repeating this operation, the regeneration order for a plurality of frames can be entered. By displaying a number, which indicates the regeneration order, in each frame of the index image every time the regeneration order is instructed, the overlap instruction can be avoided. The information relating to the frame numbers of frames which are instructed to be regenerated first and last corresponds to the previously-mentioned numbers of the regeneration start frame information and the regeneration end frame information, and information relating to frame numbers of frames which are not designated corresponds to non-regeneration frame information.

Similarly, each piece of the above-mentioned information is entered with the mouse 120 by interactive processing on the screen. When the entry of the information is over, it is selected whether or not one frame is displayed on the monitor (Step 206). When it is determined that one frame is displayed, it is possible to enter the same information while looking at the frame image.

That is, a frame number is set (Step 208), and then the film 114 is fed in the forward direction at a speed of 9.25 mm/s by one frame so that the set frame number is scanned (main-scanning) as shown in FIG. 5 (Step 210). When the main scanning is performed, the image data is picked up by the CCD buffer M1 via the CCD line sensor 142.

When the image data is picked up, the CPU 160 adjusts the image data of each frame according to AE data, AWB data and the like which are stored in the RAM 160A, so the high-quality image data can be picked up regardless of the photographing conditions of each frame. The number of picture elements in one frame, which is transmitted to the CCD buffer M1 in this way, is 512×896 as shown in FIG. 6 (D). That is, CCD output of the CCD line sensor 142 having a sensor of 1024 picture elements is thinned out to be half, so that the number of picture elements in the direction perpendicular to that in which the film is fed by one frame is 512. The film feed speed is set to be ⅛ compared to that in the case when the image data of the index image are picked up, so that the number of picture elements of one frame is 896, which is eight times as large as that of picture elements (112) in the same direction as the film feed direction of one frame of the index image.

Figure 8A:
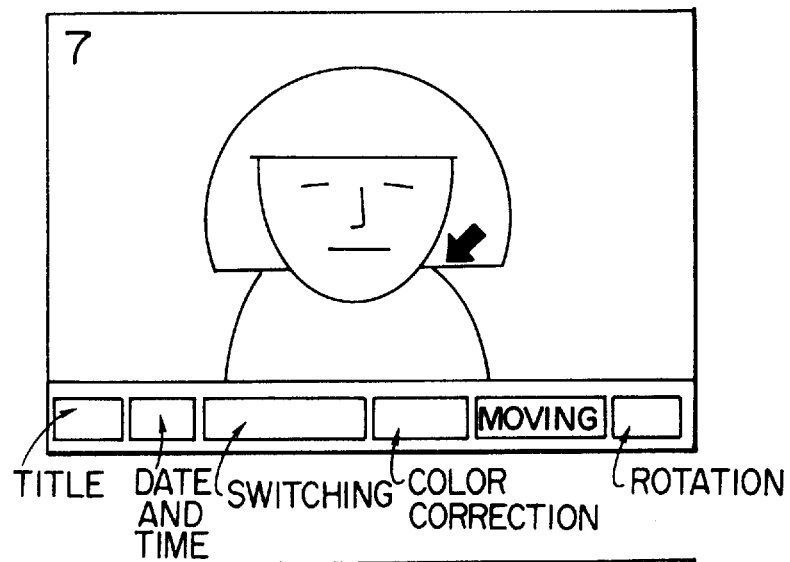
FIGS. 8(A), 8(B) and 8(C) are views illustrating examples of a monitor screen in the case when automatic regeneration information and automatic printing information are entered by using the image in one frame.
Figure 8B:
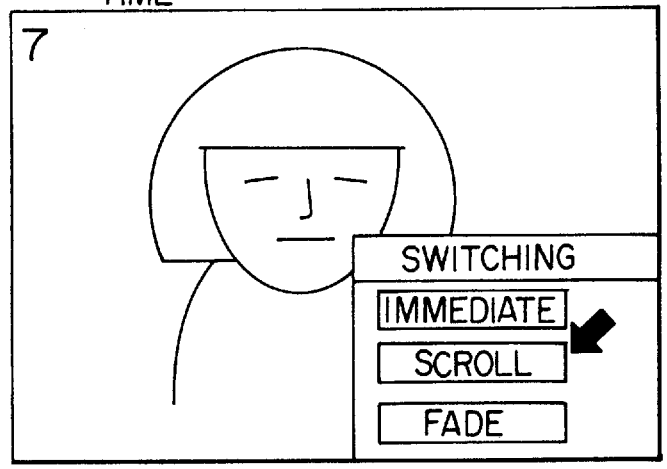
Figure 8C:
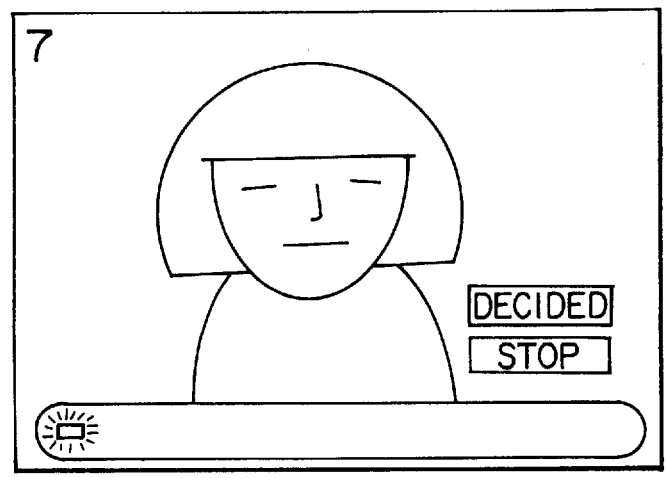

The image data in one frame, which is transmitted to the CCD buffer M1 in the above-mentioned way, is transferred to the display buffer M2, and the data in the display buffer M2 is repeatedly read out so that the image data in one frame can be displayed on the monitor TV 106. A frame number ("7 " is indicated in the drawing) is displayed at the upper left of the monitor screen as shown in FIG. 8 (A), and letters or an icon which indicates various types of the setting menu are displayed at the lower part of the monitor screen.

The above-mentioned menu is selected with the mouse 120, just like when the information is entered by use of the index image.

Now, the arrow is moved to letters or an icon which indicates the switching of the screen and the [EXECUTE] key 120A is clicked, the screen switch setting menu appears. Then, a parameter for each item of the screen switch setting menu is displayed at the lower left of the screen (FIG. 8 (B)). The previous setting parameter blinks.

Here, when the mouse 120 is moved so that the arrow moves to the optional parameter and the [EXECUTE] key 120A is clicked, the selected parameter starts blinking. When the [EXECUTE] key 120A is clicked again, the parameter is set and the setting screen of the item disappears. In the case when the operation is cancelled, the [CANCEL] key 120B is clicked. In this case, each set-up value is kept as an initial value or a previous parameter, and the setting screen disappears.

Next, explanation will be given of the case when information relating to letters are entered by use of a key board which is not shown in the drawing.

In this case, the arrow is first moved with the mouse 120, so that letters "title" or an icon on the setting screen is selected, and the [EXECUTE] key 120A is clicked. As a result, the title setting menu appears on the screen, and a rectangular white column (left corner of which blinks) is displayed at the lower part of the monitor screen, and the letters [DECIDED] and [STOP] are displayed at the right of the white column as shown in FIG. 8 (C).

Next, with a key board (which is not shown in the drawing) which is connected to the film player 100, a title is entered from a left corner toward the right side. The blinking position moves toward the right. In the case that a correction is necessary during the entry of letters, the [CANCEL] key 120B is clicked. As a result, letters of the title in the blinking part at the right side disappears one by one. When the entry is over, the arrow is moved to [DECIDED] by use of the mouse 120, and the [EXECUTE] key 120A is clicked. As a result, the title setting is completed, and the white column, and letters [DECIDED] and [STOP] disappear. In the case when the title entry is stopped, the arrow is moved to [STOP] by use of the mouse 120, and the [EXECUTE] key 120A is clicked. As a result, the information relating to the title disappears, and the title before setting remains.

In the above-mentioned way, various kinds of information can be entered by use of the mouse 120 by the interactive processing on screen. When the entry of the above-mentioned information is over (Step 214), or when the frame display is not selected in the step 206, the film 114 is fed in the forward direction at a high speed of 148.0 mm/s. During the feeding, the magnetic data which is previously read out from the magnetic record layer 114B of the film 114 and stored in the RAM 160A of the CPU 160 and the information which is entered in the steps 204 and 212 and the like are recorded in the magnetic record layer 114B of the film 114 (Step 216). Next, the film 114 is rewound in the backward direction at a high speed of 148.0 mm/s, and then the film cartridge 110 is picked out (Step 218).

Next, explanation will be given of the automatic regeneration wherein plural film images are regenerated sequentially and automatically with reference to a flow chart in FIG. 9.

Figure 9:
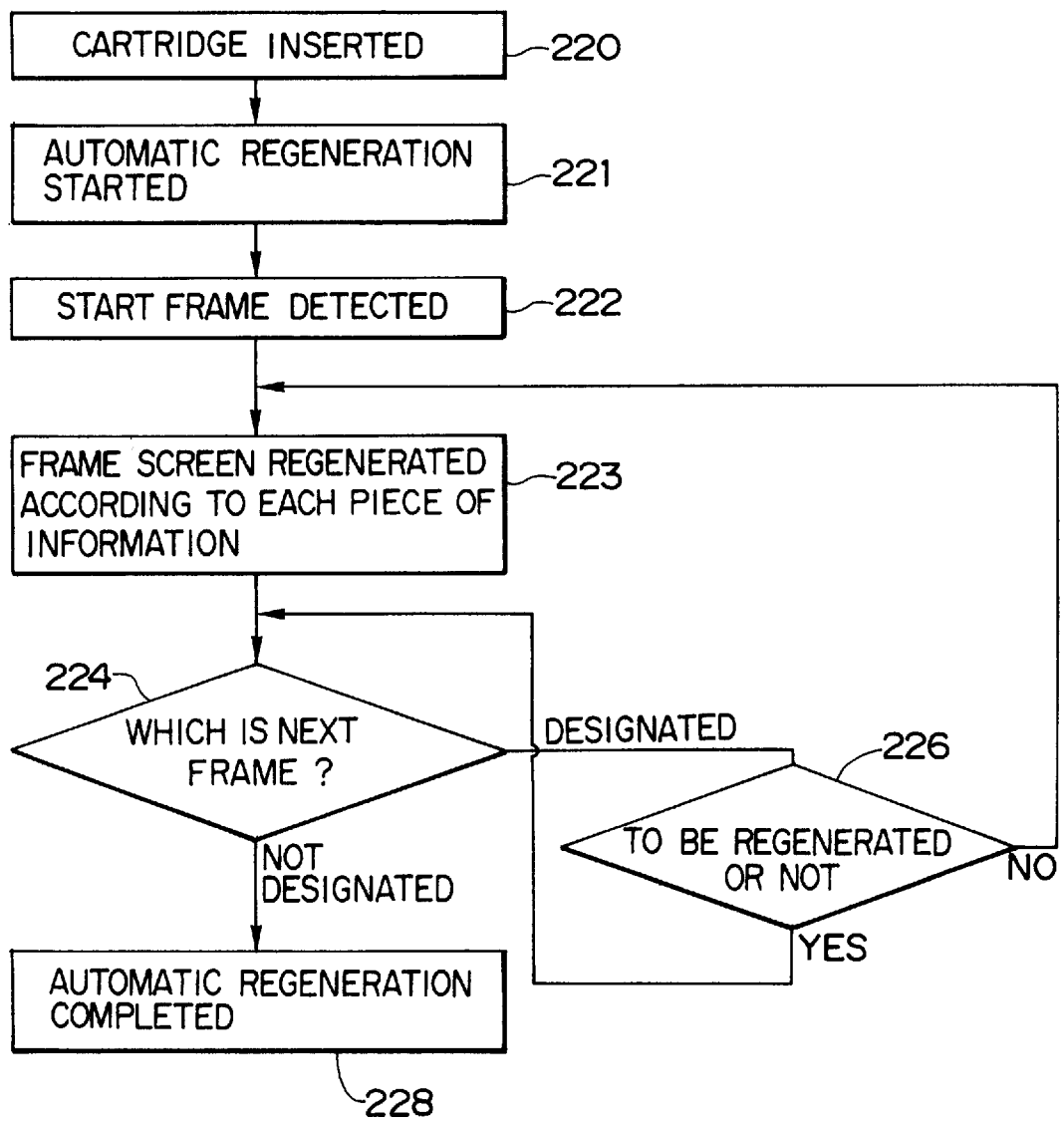
FIG. 9 is a flow chart illustrating one embodiment of automatic regeneration by the method of automatically regenerating the film image according to the present invention.

In the FIG. 9, when the film cartridge 110, in which the automatic regeneration information is recorded in the magnetic record layer thereof, is inserted into the film player 100, the pre-scanning is carried out, and the information relating to automatic regeneration is read out from the magnetic record layer 114B of the film 114 to be stored in the RAM 160A (Step 220). At this time, when an automatic regeneration key and the like, which are not shown in the drawing, are turned on, the automatic regeneration starts in each frame screen (Step 221).

That is, a start frame is detected from the information as to a start frame number in the automatic regeneration information (Step 222). Then, the regeneration of each frame screen is carried out in accordance with the automatic regeneration which corresponds to the frame (Step 223). After that, when the time of screen display which is previously set has passed, it is recognized from the next frame information whether or not there is a frame to be regenerated next (Step 224). When there is a designated frame, it is determined whether the frame is to be regenerated or not, depending on whether or not information relating to instruction for the frame which is not to be regenerated (Step 226). In the case when the frame is designated not to be regenerated, the operation returns to the step 224, and it is determined from the next frame information whether or not there is a frame to be regenerated next.

On the other hand, in the case when the frame is designated to be regenerated, the operation proceeds to the step 223, and the regeneration of the frame screen is carried out in accordance with the automatic regeneration information corresponding to the frame. In this way, the processing from the step 223 to the step 226 is repeated, so that the automatic regeneration of plural frames which are previously designated can be regenerated. In the step 224, when the completion of the automatic regeneration is recognized from the end frame information, the automatic regeneration is finished (Step 228).

In this embodiment, the automatic regeneration information is recorded in the magnetic record layer 114B of the film 114, but the present invention is not limited to this. The automatic regeneration information can be also recorded in a memory card, a floppy disk, a hard disk, etc. which are separated from the IC memory integrated in the film cartridge 110 or the film cartridge 110. The automatic regeneration information can be read out from the above-mentioned outer record medium at the time of automatic regeneration.

Next, an explanation will be given of the case that the IC memory integrated in the film cartridge 110 is used, and the automatic regeneration screen and the like are recorded in the VTR 107.

Figure 10:
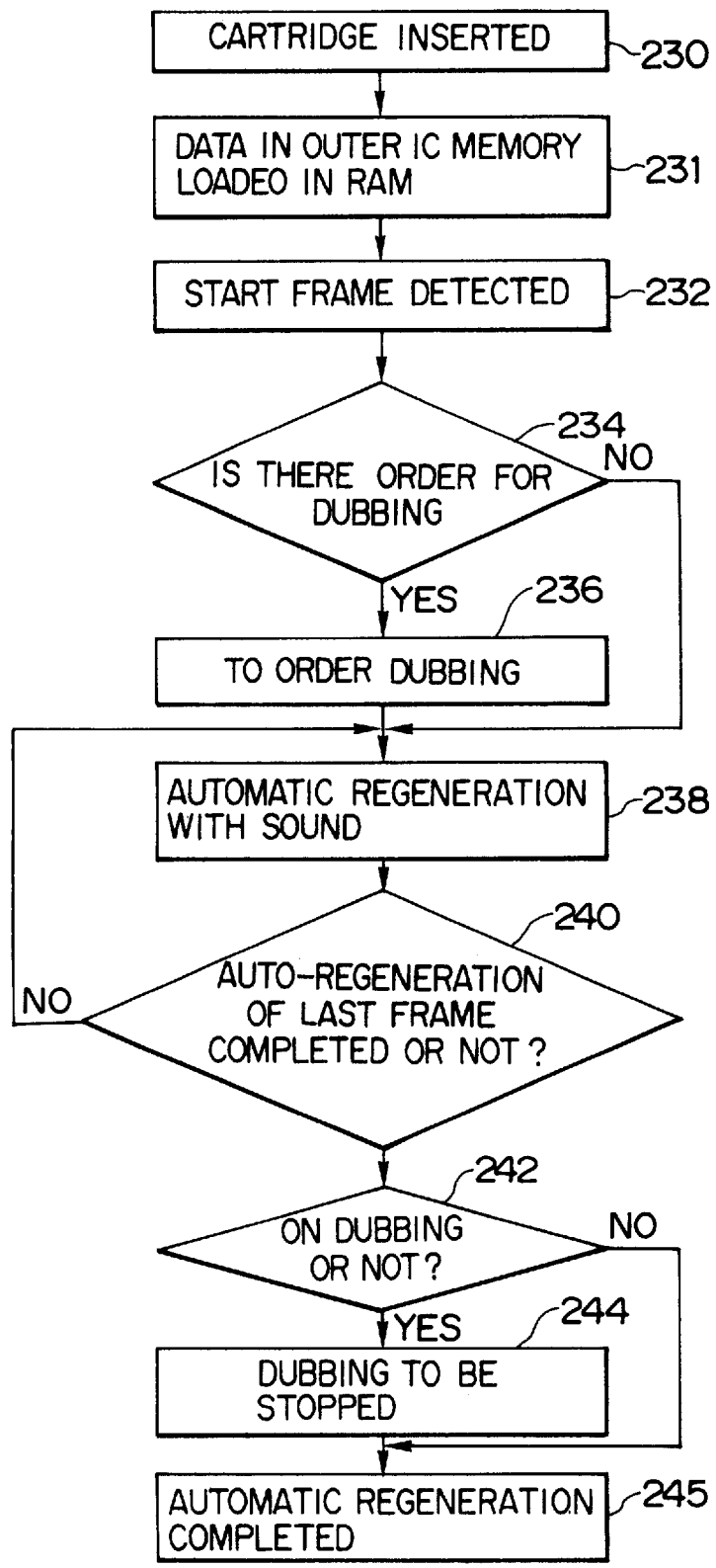
FIG. 10 is a flow chart illustrating the other embodiment of automatic regeneration by the method of automatically regenerating the film image according to the present invention.

In this case, when the film cartridge 110 is inserted as shown in FIG. 10 (Step 230), the automatic regeneration information is read out from the IC memory integrated in the film cartridge 110 to be stored in the RAM 160A of the film player 100 (Step 231). At this time, when an automatic regeneration key, etc. are turned on, a start frame is detected from the information concerning a start frame number (Step 232). Next, it is recognized whether or not there is the information as to the instruction for dubbing in the VTR 107 in the automatic regeneration information (Step 234).

In the case when there is the information as to instruction for dubbing in the VTR 107, the film player 100 sends a control signal, which instructs the dubbing to start, for the VTR 107 (Step 236). The above-mentioned control signal is transmitted to the VTR 107 via a general-purpose RS-232C for example. A video signal and a sound signal, which indicates the frame image, are transmitted from the monitor TV 106 to the VTR 107 (refer to FIG. 1).

Then, when the control signal, which instructs the start of dubbing, is transmitted to the VTR 107, or when there is no dubbing instruction in the VTR 107, the regeneration of the frame screen is carried out in accordance with the information relating to automatic regeneration which corresponds to the frame while music is played from the first frame to the last according to the information relating to music and comments, or while comments are transmitted to each frame, the frame screen is regenerated in accordance with the information relating to automatic regeneration which corresponds to the frame (Steps 238 and 240). The sound information relating to music, comments, etc. is not limited to one at the time when the information concerning automatic regeneration. The information can be related to the sound which has been recorded by a camera at the time of photographing or the background sound.

On the other hand, in the step 240, when it is recognized by the information as to the regeneration end frame number that the automatic regeneration is over, it is determined whether the dubbing is being performed or not in the VTR 107 (Step 242). In the case when the dubbing is being performed, the VTR 107 is ordered to stop dubbing, and when the dubbing is not being performed, the automatic regeneration is immediately stopped (Steps 244 and 245).

Figure 11:
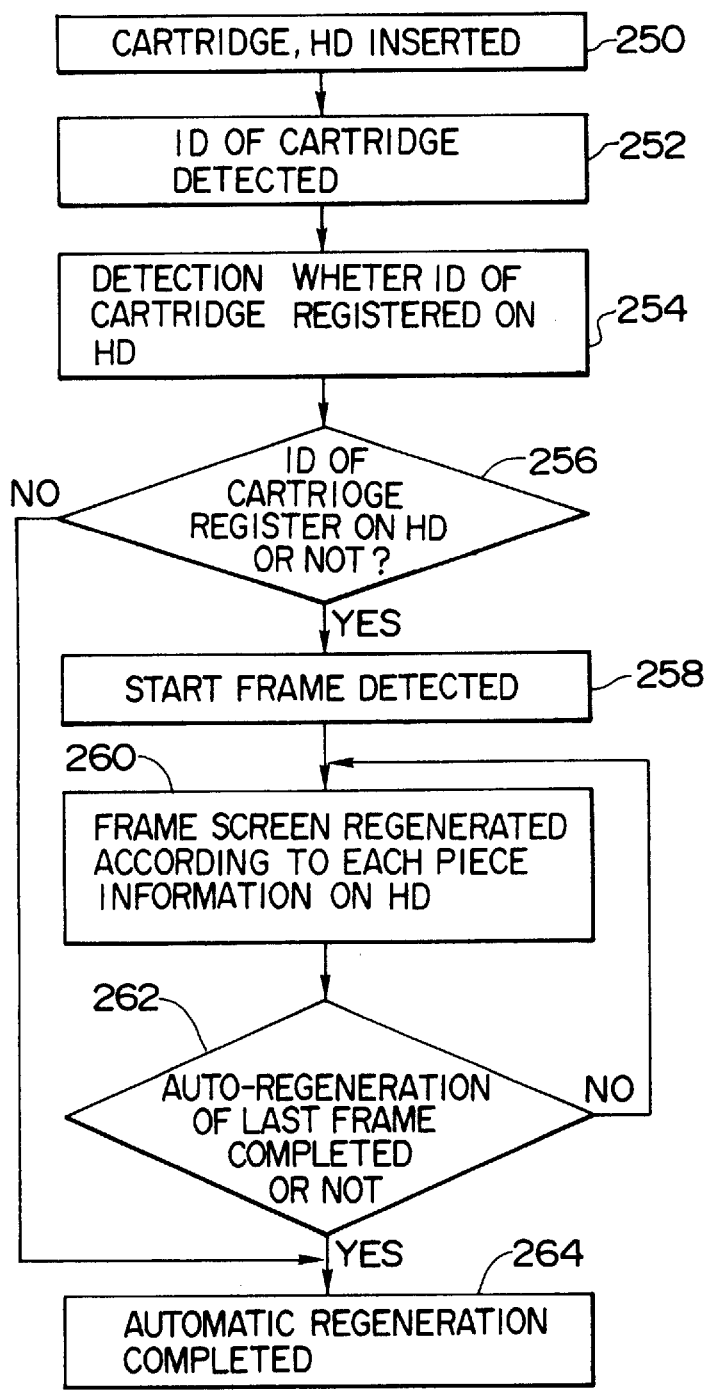
FIG. 11 is a flow chart illustrating the other embodiment of automatic regeneration by the method of automatically regenerating the film image according to the present invention.

Next, an explanation will be given of the case that the film cartridge 110 in which an ID number of the cartridge is optically recorded, or the cartridge 110 housing the film on which an ID number of the cartridge is optically recorded. In this case, the film cartridge 110 is inserted into the film player 100 as shown in FIG. 11, and the hard disk is also inserted into the disk driver which is not shown in the drawing (Step 250). The film player 100 optically detects the ID number of the cartridge from the film cartridge 110 at the time of the film-loading (Step 252). Then, the film player 100 instructs to determine whether detected ID number of the cartridge is registered in the hard disk. When the cartridge ID number of the film cartridge 110 is not registered in the hard disk, the automatic regeneration is finished (Step 264), and, for example, the hard disk is replaced.

On the other hand, when the cartridge ID number is registered in the hard disk, the automatic regeneration information is read out from the hard disk to be stored in the RAM 160A, and a start frame is detected from the start frame information of the automatic regeneration information (Step 258). Then, the regeneration of the frame screen is carried out in accordance with the automatic regeneration information which corresponds to the frame (Step 260).

After that, when the time of screen display, which is previously set, has passed, it is determined whether or not the automatic regeneration of the last frame is over (Step 262). In the case that the regeneration of the last frame has not completed, the operation returns to the Step 260, and in the case that the above-mentioned regeneration is completed, the automatic regeneration is finished.

Next, an explanation will be given of the case when plural film images are full-automatically printed.

Figure 12:
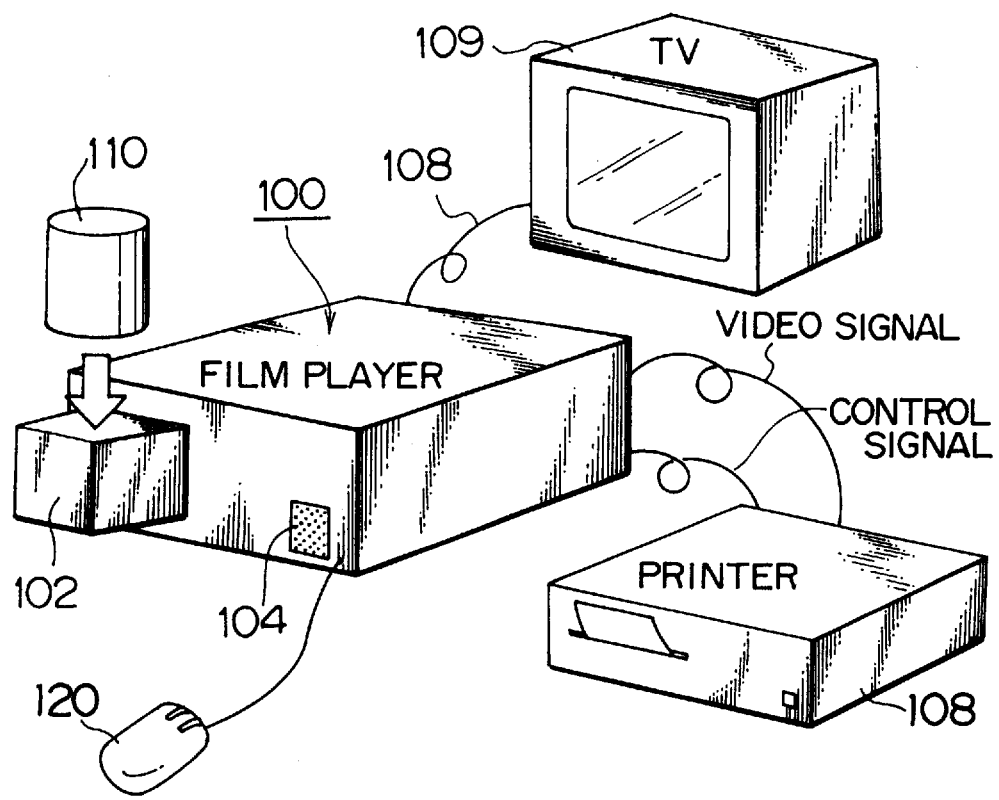
FIG. 12 is an outer view illustrating the film player wherein the method of automatically printing the film image according to the present invention is applied; and, FIG. 13 is a flow chart illustrating one embodiment of automatic printing by the method of automatically printing the film image according to the present invention.
Figure 13:
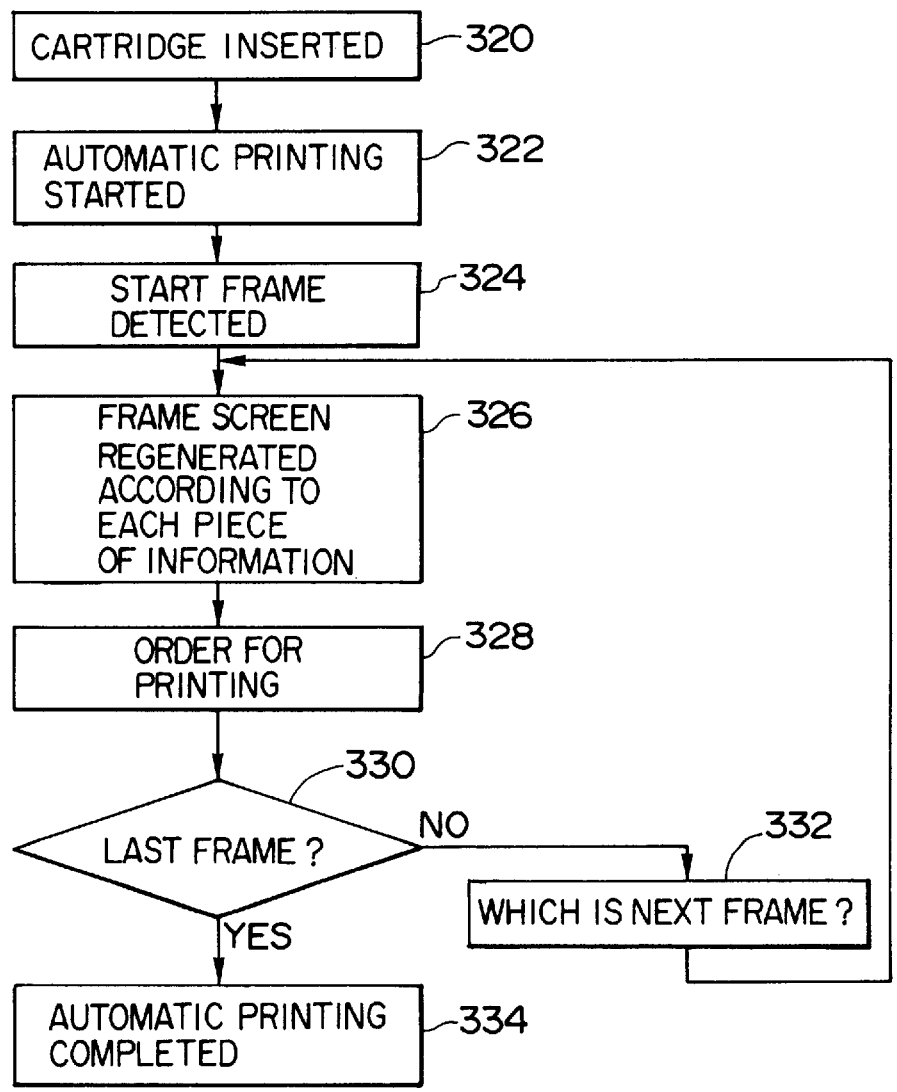

FIG. 12 is an outer view of a film player wherein the method of automatically printing the film image according to the present invention is applied. FIG. 13 is a flow chart in the case when the automatic printing is performed. In FIG. 12, the same marks are put on the same parts as those of FIG. 1, and a detailed explanation is omitted here.

As shown FIG. 12, a printer 108, not the VTR of FIG. 1, is connected to the film player 100 instead of the VTR of FIG. 1, and the film player 100 sends a video signal and a control signal to the printer 108. In FIG. 13, when the film cartridge 110, in which the automatic printing information is recorded in a magnetic record layer thereof, is inserted into the film player 110 in the same way as when the above-mentioned automatic regeneration is performed, the pre-scanning is carried out, and the automatic printing information is read out from the magnetic record layer 114B to be stored in the RAM 160a (Step 320). When automatic printing switches, etc. which are not shown in the drawings, are turned on, automatic printing starts in each frame screen (Step 322).

That is, a start frame is detected from the automatic printing information (Step 324). As the start frame, for example, the frame of which number is the smallest is selected among plural frames for which the number of prints is designated. Then, the frame screen is regenerated in accordance with the automatic print information corresponding to the frame (Step 326). Next, a video signal and a control signal which controls the printer 108 are sent to the printer 108 so that the previously-set number of prints can be produced for the regenerated frame (Step 328).

The film player 100 receives a signal, which indicates that printing is over, from the printer 108, and then recognizes whether or not printing in the last frame is completed (Step 330). A frame of the largest frame number is selected as the last frame among the plural frames in which the number of prints is designated. When the printing in the last frame is not completed, a position of a frame to be printed next is detected (Step 332). After that, the processing returns to the step 326, and the regeneration and printing of the frame screen are carried out in accordance with the automatic printing information corresponding to the frame.

In the above-mentioned way, the processing from the step 326 to the step 332 is repeated, and the plural frames which have been previously instructed to be printed are automatically regenerated. On the other hand, in the step 330, when it is recognized that the printing in the last frame is over, the automatic printing is finished.

In this embodiment, the automatic regeneration information and the automatic printing information are recorded in the magnetic record layer 114B, but the present invention should not be limited to this only. This information can be stored in an IC memory belonging to the film cartridge 110, a memory card, a floppy disk and a hard disk and the like, which are provided separately from the film cartridge 110, etc., and the automatic regeneration information and the automatic printing can be read out from the above-mentioned outer storage memories at the time of automatic regeneration or automatic printing.

As has been described above, according to the method of automatically regenerating the film image according to the present invention, the index image which shows the plural frames on the film strip within the film cartridge and/or the film image in one frame is displayed on a monitor TV, and the automatic regeneration information for regenerating plural film images on the film sequentially and automatically is entered by looking at the display screen, The entered automatic regeneration information is recorded in the record medium which corresponds to the film cartridge, so that the automatic regeneration information can be read out from the above-mentioned record medium and plural film images on one film strip can be sequentially and full-automatically regenerated in accordance with the readout information relating to automatic regeneration at the time of automatic regeneration. Accordingly, once the automatic regeneration information is recorded in the record medium, the automatic regeneration can be carried out repeatedly and anytime.

Similarly, according to the method of automatically printing the film image according to the present invention, the index image which indicates the plural frames on the film strip within the film cartridge and/or the film image in one frame are displayed on a monitor TV, and the automatic printing information for regenerating plural film images on the film is entered by the user who is looking at the display screen. The entered automatic printing information is recorded in the record medium which corresponds to the film cartridge, so that the automatic printing information can be read out from the record medium and plural film images on a film strip can be printed sequentially and automatically printed in accordance with the readout automatic printing information. Therefore, once the automatic printing information is recorded in the record medium, the film image on a film strip can be full-automatically printed, and furthermore, additional copies having the same quality as an original print can be obtained.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of automatically printing a film image which uses a film cartridge housing a developed still photographic film, a player which feeds the film from the film cartridge to an image reading part, picks up a film image and displays the film image on a display, and a printer which prints the film image in accordance with a video signal, comprising the steps of:

displaying an index image which shows plural frames on the film strip within said film cartridge and/or a film image in one frame on said display via said film player;

entering multipurpose information relating both to automatic regeneration of film images on the display and to automatic printing of plural film images within said film sequentially and automatically, said multipurpose information being input by a user while looking at a screen of said display;

entering automatic printing information indicating film images to be printed;

recording said multipurpose information and said automatic printing information in a record medium corresponding to the film cartridge;

reading out said automatic printing information and said multipurpose information from said record medium, picking up the film image which is instructed to be printed in accordance with said automatic printing information via said film player; and transmitting the video signal which indicates the film image and a control signal which controls the printer to said printer.

2. The method of automatically regenerating the film image according to claim 1, wherein said record medium is one of record mediums such as a magnetic record layer which is formed on said photographic film, a semiconductor memory which is provided in said film cartridge or a memory card, and a magnetic disk which correspond to said film cartridge.

3. The method of automatically regenerating the film image according to claim 1, wherein said automatic printing information includes information which indicates a number of prints made for each frame.

4. The method of automatically printing the film image according to claim 1, wherein said multipurpose information is at least one of information as to letters, information as to the date and time of photographing, information as to trimming, information as to color correction which is set manually, information as to a special monitor effect, information as to color correction which is set automatically, and information as to a close-up which includes information concerning photographing magnification and a central position of photographing.

5. The method of automatically regenerating the film image according to claim 1, further comprising displaying an index image on said display while entering automatic information relating to plural film images within said film sequentially and automatically.

6. An apparatus for outputting image signals and control signals to a printer comprising:

a film cartridge housing a developed still photographic film;

a player which feeds the film from the film cartridge to an image reading part, picks up a film image and displays the film image on a display;

a display which displays an index image which shows plural frames on the film strip within said film cartridge and/or a film image in one frame on said display via said player;

means for entering multipurpose information relating both to automatic regeneration of film images on the display and to printing of plural film images within said film sequentially and automatically, said multipurpose information being input by a user while looking at said display, said means for entering also being used to enter automatic printing information indicating film images to be printed;

a record medium corresponding to the film cartridge for storing said multipurpose information and said automatic printing information;

means for reading out said multipurpose information and said automatic printing information from said record medium, picking up the film image which is instructed to be printed in accordance with said automatic printing information via said player; and means for transmitting the video signal which indicates the film image and a control signal to the printer.

7. A printer system comprising:

a printer which prints a film image in accordance with a video signal; and an apparatus which generates the video signal comprising;

a film cartridge housing a developed still photographic film, a player which feeds the film from the film cartridge to an image reading part, picks up a film image and displays the film image on a display, a display which displays an index image which shows plural frames on the film strip within said film cartridge and/or a film image in one frame on said display via said player, means for entering multipurpose information relating both to automatic regeneration of film images on the display and to printing of plural film images within said film sequentially and automatically, said multipurpose information being input by a user while looking at said display, said means for entering also being used to enter automatic printing information indicating film images to be printed, a record medium corresponding to the film cartridge for storing said multipurpose information and said automatic printing information, means for reading out said multipurpose information and said automatic printing information from said record medium, picking up the film image which is instructed to be printed in accordance with said automatic printing information via said player, and means for transmitting the video signal which indicates the film image and a control signal to the printer.

* * * * *